United States Patent [19]

Herbert et al.

[11] Patent Number: 4,584,240
[45] Date of Patent: Apr. 22, 1986

[54] COEXTRUDED MONOFILAMENT FISHLINE

[75] Inventors: Paul F. Herbert, Washington; Robert L. Rackley, Parkersburg, both of W. Va.

[73] Assignee: E. I. Du Pont de Nemours and Company, Wilmington, Del.

[21] Appl. No.: 753,554

[22] Filed: Jul. 12, 1985

Related U.S. Application Data

[63] Continuation-in-part of Ser. No. 637,803, Aug. 6, 1984.

[51] Int. Cl.$^4$ ............................................. D02G 3/00
[52] U.S. Cl. ................................... 428/373; 43/44.98; 428/401
[58] Field of Search ............... 428/373, 374, 375, 395, 428/401; 43/44.98; 264/171 F

[56] References Cited

U.S. PATENT DOCUMENTS

| 3,551,279 | 12/1970 | Ando et al. | 428/373 X |
| 3,700,544 | 10/1972 | Matsui | 428/373 |
| 3,758,979 | 8/1973 | Martuch et al. | 43/44.98 |
| 3,975,351 | 8/1976 | Etchells | 428/373 |
| 4,353,960 | 10/1982 | Endo et al. | 43/44.98 X |
| 4,459,337 | 7/1984 | Hansen | 43/44.98 |

FOREIGN PATENT DOCUMENTS

| 2713435 | 10/1977 | Fed. Rep. of Germany | 43/44.98 |
| 51-13689 | 2/1976 | Japan | 43/44.98 |
| 52-33033 | 8/1977 | Japan | 43/44.98 |

Primary Examiner—Lorraine T. Kendell

[57] ABSTRACT

Coextruded monofilament fishline having a core of polymer having a wet initial tensile modulus greater than that of the sheath.

11 Claims, 2 Drawing Figures

FORCE VS ELONGATION
9 METERS OF WET FISHLINE

EXAMPLE C
EXAMPLE B
EXAMPLE A
EXAMPLE 1

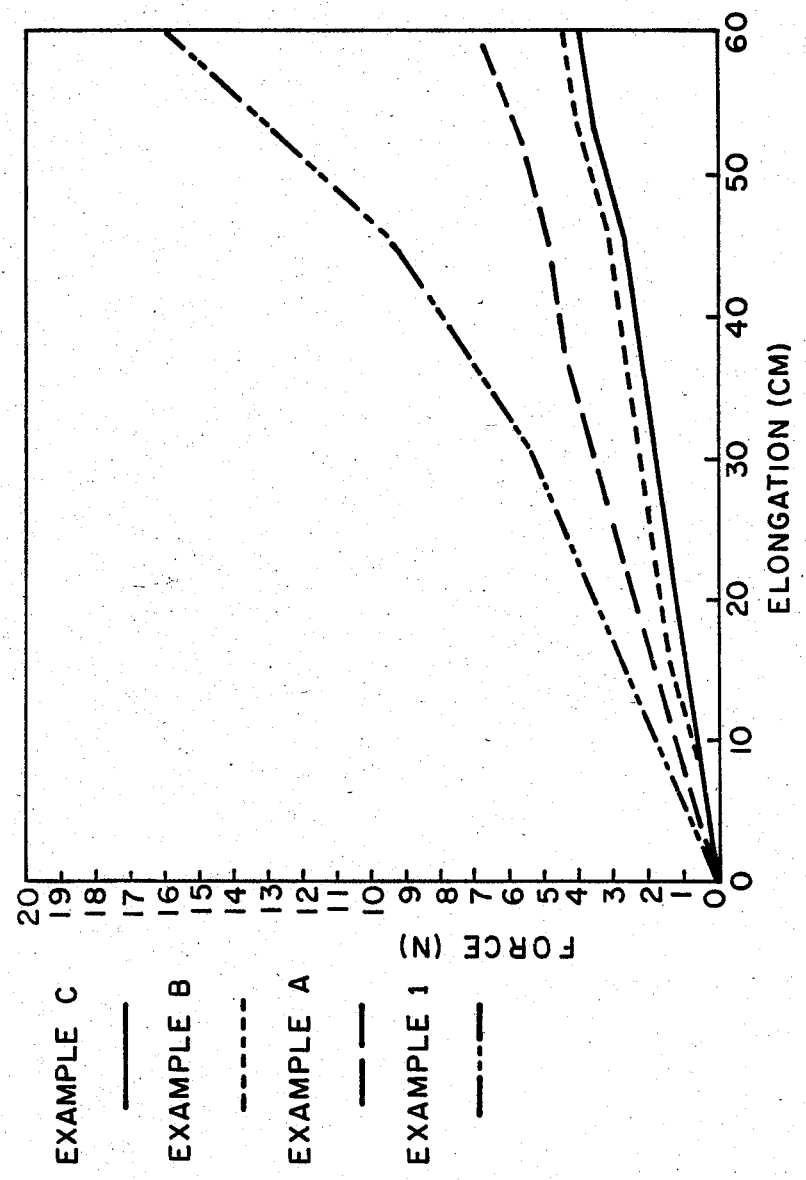

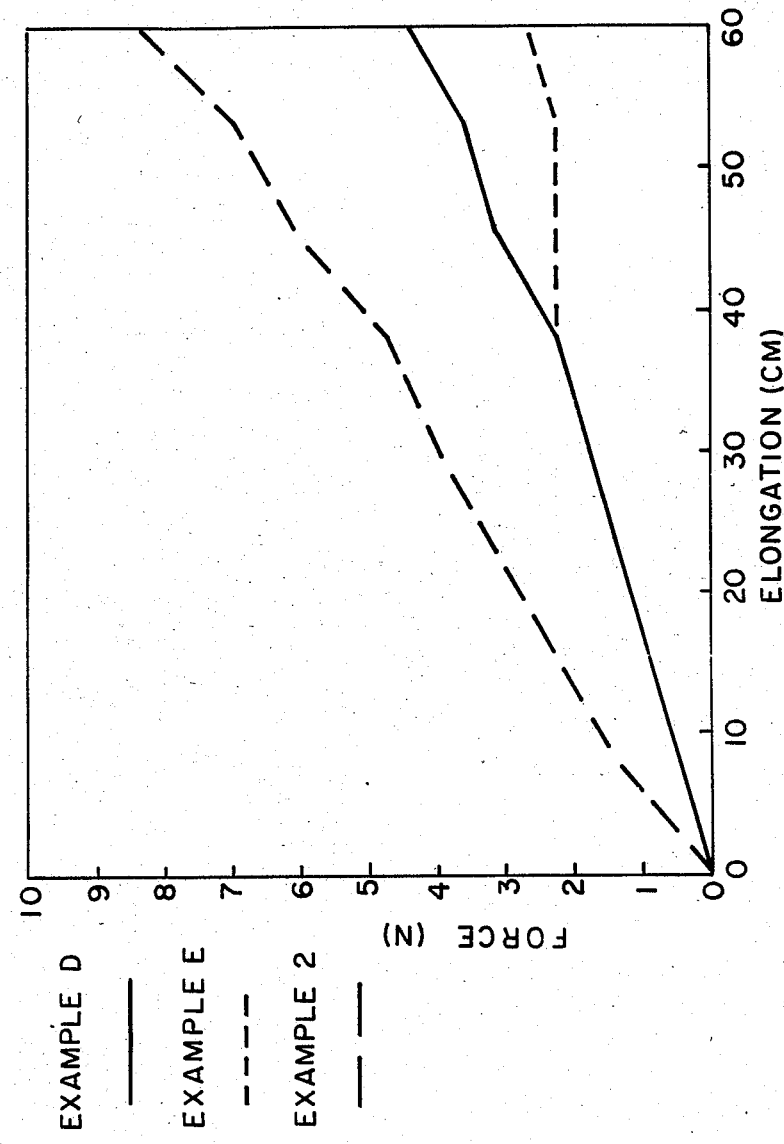

COEXTRUDED MONOFILAMENT FISHLINE

CROSS-REFERENCE TO RELATED APPLICATION

This is a continuation-in-part of copending application Ser. No. 637,803, filed Aug. 6, 1984.

BACKGROUND OF THE INVENTION

Oriented polymeric monofilament is widely used as fishline. For this application, it has been found important to balance several properties in a monofilament that are important in its use as a fishline. These include tensile strength, shock strength, abrasion resistance, knot strength, limpness, stretch and visibility. Over the years, significant improvements have been made to one or more of these characteristics, as indicated, for example, in U.S. Pat. Nos. 3,156,750 and 3,595,952.

Despite the improvements that have been made in monofilament fishline, a continuing difficulty is the balance between hook setting ability and castability. A responsive line, and one having good hook setting performance, is generally characterized by a low stretch and high tensile strength. However, with increasing stiffness and reduced stretch, the castability of the monofilament fishline decreases. Accordingly, it has previously been difficult to obtain excellent performance in both of these seemingly inconsistent properties.

SUMMARY OF THE INVENTION

The present invention provides an improved monofilament fishline which is characterized by outstanding hook setting performance and feel as well as excellent castability.

Specifically, the instant invention provides a coextruded oriented monofilament fishline having a diameter of about from 0.1 to 1.2 mm, the fishline being substantially circular in cross-sectional configuration and having a concentric sheath and core construction, and wherein the wet initial tensile modulus of the oriented core polymer is at least about 5 times the wet initial tensile modulus of the oriented sheath polymer and wherein the ratio "α" of the volume fraction of the core to the total volume of the monofilament is limited by the relationship:

$$\frac{1}{n-1} < \alpha < \sqrt{\frac{1}{n-1}}$$

wherein n is the ratio of the wet initial tensile modulus of the oriented core polymer to the wet initial tensile modulus of the oriented sheath polymer, and wherein at least about 50% of the core polymer is polyamide or polyester.

BRIEF DESCRIPTION OF THE FIGURES

FIGS. 1 and 2 are graphical representations of the elongation of fishlines under stress.

DETAILED DESCRIPTION OF THE INVENTION

The monofilaments of the present invention are coextruded structures having a sheath and a core. These monofilaments are prepared by conventional coextrusion techniques, as described, for example, in U.S. Pat. No. 2,932,482, hereby incorporated by reference.

The core of the coextruded monofilaments of the present invention comprises at least about 50%, and preferably at least about 70%, of polyesters or polyamides which, when formed into a filament and oriented by drawing about from 4.5 to 6 times their original length, exhibit a wet tensile strength greater than about 500 MPa and a wet initial tensile modulus greater than about 3500 MPa. Wet tensile strength and wet initial tensile modulus as so noted are measured by ASTM test D-2101-79 on filament samples having been conditioned to equilibrium with room temperature water over a period of at least about two (2) hours. Polymers which can exhibit the required wet tensile strength and wet initial tensile modulus include polyamides such as poly(hexamethylene dodecanoamide) (nylon 612) and blends containing at least about 80 percent of this polyamide, poly(hexamethylene sebacamide) (nylon 610) and copolymers and polymer blends containing at least about 80 weight percent of this polyamide, and poly(dodecanolactam) (nylon 12) and copolymers and polymer blends containing at least about 80 weight percent of this polyamide.

Other polymers which can exhibit the required wet tensile strength and wet initial tensile modulus include polyesters such as polyethylene terephthalate, polybutylene terephthalate and blends of each of these with each other and other polymers such as elastomers. Elastomers which can be so used include, for example, copolyetheresters such as that commercially available from E. I. du Pont de Nemours and Company as Hytrel ® copolyetherester.

A particularly desirable polymer blend for use as the core material in the present coextruded monofilaments is at least about 80 percent polyethylene terephthalate and at least about 5 percent of a copolymer of tere- and iso-phthalic acids, 1,4-butane diol and polytetramethylene ether glycol. Such copolyetherester polymers can be prepared according to the teachings of Witsiepe, U.S. Pat. Nos. 3,651,014 and 3,763,109, both of which are hereby incorporated by reference.

Factors which will affect the wet tensile strength and wet initial tensile modulus of the polymers used for the core include molecular weight, draw ratio and composition. In general, the required wet tensile strength and wet initial tensile modulus will be attained with a number average molecular weight of at least about 12,000.

Polymers which can be used for the sheath of the present coextruded monofilaments are those that exhibit a wet tensile strength greater than about 500 MPa and a wet initial tensile modulus of less than about 1400 MPa. Polymers which can exhibit these characteristics include polycaprolactam (nylon 6) or blends of nylon 6 with other polymers in which the nylon 6 represents at least about 60 percent of the blend. Representative polymers with which the nylon 6 can be blended include nylon 11, nylon 12 and nylon 6,6. The nylon 6 can also be blended with copolymers of nylon 6 and one or more other nylons such as nylon 11, nylon 12 and nylon 6,6.

The relative ratios of sheath and core polymers in the present monofilament fishlines can vary widely. However the core should represent about from 10 to 50 percent of the total weight of the coextruded monofilament. The approximate volume fraction of core to total filament, "α", is limited by the relationship:

$$\frac{1}{n-1} < \alpha < \sqrt{\frac{1}{n-1}}$$

in which "n" is the ratio of the wet initial tensile modulus of the oriented core polymer to the wet initial tensile modulus of the oriented sheath polymer. Within the tensile modulus requirements set forth above, the ratio of the tensile modulus of the core material to the tensile modulus of the oriented sheath polymer should be greater than about 5, and a ratio of greater than about 10 has been found to give particularly desirable performance characteristics in the completed fishline, particularly when the core comprises at least about 50% polyethylene terephthalate.

After coextrusion of the sheath and core materials, the coextruded monofilament is oriented by stretching about from 4.5 to 6.0 times its original length, and preferably about from 5.0 to 5.7 times its original length, to increase the monofilament strength. The oriented monofilaments have a diameter of about from 0.1 to 1.2 mm, depending on the pound tests required in the fishline. A particularly satisfactory orientation technique is the two stage drawing process described in Cuculo U.S. Pat. No. 3,156,750. After orientation, the coextruded monofilament can be further treated to improve other physical properties, as by steam conditioning described in Boyer et al. U.S. Pat. No. 3,595,952.

The preferred combination of a polyethylene terephthalate polymer blend for use as the core and a sheath of nylon 6 provides particularly outstanding performance characteristics as a fishline. In addition, the two basic components provide particular ease of manufacture in that the melt processing temperatures of the core and sheath polymers are relatively close and exhibit a compatibility of draw characteristics for subsequent orientation of the coextruded monofilament.

The present invention is further illustrated by the following specific examples, in which parts and percentages are by weight unless otherwise indicated.

EXAMPLE 1 AND COMPARATIVE EXAMPLES A-C

In Example 1, coextruded filaments consisting of a core containing an extrusion blend of 9% Hytrel® 7246 copolyetherester and 91% poly (ethylene terephthalate) and a sheath of polycaprolactam were prepared and tested.

Dried pellets of the core polymers were mixed together and fed into an extruder maintained at approximately 280° C. The melt blend was then passed through a metering pump to the spin head. At the same time dried sheath polymer was fed to an extruder maintained at approximately 260° C. The melt from the sheath also passed through a metering pump to the spin head. The spin head was maintained at approximately 280° C. The two melts were combined in the spin head to produce four coextruded filaments. The sheath and core metering pumps were adjusted to produce coextruded filaments with 25% core by volume. The filaments were quenched in 20° C. water, oriented by a two stage drawing process, and relaxed in steam to increase knot strength. The resulting 0.32 mm filament was wound on a spool. The 2 hour wet breakload of this filament was tested and found to be 43.2 N (9.7 pounds). The ratio of the wet initial tensile modulus of the oriented core polymer to the that of the oriented sheath polymer is 10; and the volume fraction of the core to the total volume of the monofilament, α, is 0.25.

In Comparative Examples A, B, and C, nylon monofilament fishline was obtained in commercial packages. Example A is Du Pont's 53.4 N (12 pound) test. Stren® clear monofilament fishline having a diameter of 0.35 mm and commercially available from E. I. du Pont de Nemours and Company. Example B is 53.4 N (12 pound) test Trilene XL® fluorescent clear/blue fishline with a diameter of 0.33 mm and commercially available from Berkley and Co. Example C is 53.4 N (12 pound) test Sigma® clear blue fluorescent fishline with a diameter of 0.34 mm and commercially available from Shakespeare Co.

The fishline of Examples 1, A, B, and C were placed in a 9 meter long pan filled with water at 23° C. the lines were allowed to soak until they reached equilibrium with the water. Then each line was individually pulled from 0-60 cm and force measurements were recorded. The results are shown in FIG. 1. The coextruded monofilaments of the present invention develop significantly more resistance force than those of Examples A, B, and C at small elongations and would therefore be much more sensitive to a fish strike.

EXAMPLE 2 AND COMPARATIVE EXAMPLES D AND E

In Example 2, a coextruded filament was produced by the same procedure and from the same materials as in Example 1, except that the monofilament had a diameter of 0.29 mm and a 2-hour wet breakload of 38.7 N (8.7 pounds).

In Comparative Examples D, and E, nylon monofilament fishline was obtained in commercial packages. Example D is 35.6 N (8 pound) test Stren® clear monofilament fishline with a diameter of 0.28 mm. Example E is 35.6 N (8 pound) test Trilene XL® fluorescent clear/blue fishline with a diameter of 0.26 mm.

The fishlines were tested in a 9 meter long pan as in Example 1 and Comparative Examples A-C The results are shown in FIG. 2. The coextruded monofilaments of the present invention develop significantly more resistance force than those of Comparative Examples D and E.

EXAMPLES 3-8 AND COMPARATIVE EXAMPLES F-I

In Examples 3-8 and Comparative Examples F-H, coextruded filaments were produced as in Example 1 but with different core polymers. All of these filaments have a polycaprolactam sheath. The Table lists the core polymers and core ratios for these filaments. The samples were tested in an Instron tensile testing machine, after conditioning the filament to equilibrium with 23° C. water. The stress at 1,5, and 10 percent elongation is shown in the Table. The ratio of the wet initial tensile modulus of the core to the that of the sheath, (n), and the percent of the core to the total volume of the monofilament are also shown in the Table.

In Example I, Du Pont's 75.6 N (17 pound) test Stren® monofilament fishline was obtained in a commercial package. This filament was tested in the same manner as above and the resulting data shown in the Table.

Examples 3-8 all have high modulus, low stretch cores resulting in coextruded filament stresses at 1, 5, and 10 percent elongation being greater than Example I, a nylon monofilament.

Examples G and H are coextruded filaments with polycaprolactam cores and sheaths. The stress values show there is no advantage to coextruding the same polymers.

Example F is a coextruded filament with a polyethylene core. The wet initial tensile modulus of polyethylene is similar to polycaprolactam at the draw ratio used. The stress values, therefore, are lower than Example I showing there is no advantage in coextruding a filament with a similar or low modulus core.

TABLE 1

| EXAMPLE | CORE | SHEATH | PERCENT CORE | STRESS (MPa) AT 1% ELONGATION | 5% | 10% | n |
|---|---|---|---|---|---|---|---|
| 3 | poly(ethylene terephthalate) | polycaprolactam (nylon 6) | 14 | 19 | 76 | 262 | 15 |
| 4 | 90% poly(ethylene terephthalate)/ 10% Hytrel ® 7246 | polycaprolactam (nylon 6) | 13 | 20 | 76 | 262 | 13 |
| 5 | 80% poly(ethylene terephthalate)/ 20% Hytrel ® 7246 | polycaprolactam (nylon 6) | 27 | 22 | 83 | 283 | 8.9 |
| 6 | 80% poly(ethylene terephthalate)/ 20% Hytrel ® 7246 | polycaprolactam (nylon 6) | 18 | 18 | 69 | 255 | 9.7 |
| 7 | poly hexamethylene dodecanoamide (nylon 6-12) | polycaprolactam (nylon 6) | 31 | 20 | 83 | 269 | 7.0 |
| 8 | polydodecanolactam (nylon 12) | polycaprolactam (nylon 6) | 32 | 12 | 62 | 193 | 4.5 |
| F | polyethylene | polycaprolactam (nylon 6) | 23 | 8 | 35 | 90 | 3.2 |
| G | polycaprolactam | polycaprolactam (nylon 6) | 30 | 7 | 41 | 138 | 3.2 |
| H | extracted polycaprolactam | polycaprolactam (nylon 6) | 30 | 8 | 41 | 131 | 3.2 |
| I | Stren ® | — | 100 | 8 | 41 | 131 | 3.2 |

We claim:

1. A coextruded oriented monofilament fishline having a diameter of about from 0.1 to 1.2 mm, the fishline being substantially circular in cross-sectional configuration and having a concentric sheath and core construction, and wherein the wet initial tensile modulus of the oriented core polymer is at least about 5 times the wet initial tensile modulus of the oriented sheath polymer and wherein the ratio "α" of the volume fraction of the core to the total volume of the monofilament is limited by the relationship:

$$\frac{1}{n-1} < \alpha < \sqrt{\frac{1}{n-1}}$$

wherein n is the ratio of the wet initial tensile modulus of the oriented core polymer to the wet initial tensile modulus of the oriented sheath polymer and wherein at least about 50% of the core polymer is a polyamide or polyester.

2. A coextruded fishline of claim 1 wherein the core is polyamide which, when formed into a filament and oriented by drawing about from 4.5 to 6.0 times its original length, exhibits a wet tensile strength greater than about 500 MPa and a wet initial tensile modulus greater than about 3500 MPa.

3. A coextruded monofilament fishline of claim 2 wherein the core comprises at least about 80 percent poly (hexamethylene dodecanoamide).

4. A coextruded monofilament fishline of claim 2 wherein the core comprises at least about 80 weight percent poly(hexamethylene sebacamide).

5. A coextruded monofilament fishline of claim 1 wherein the core is a polyester which, when oriented by drawing about from 4.5 to 6.0 times its original length exhibits a wet tensile strength greater than about 500 MPa and a wet initial tensile modulus greater than about 3500 MPa.

6. A coextruded monofilament fishline of claim 5 wherein the wet initial tensile modulus of the oriented core polymers is at least about 10 times the wet initial tensile modulus of the oriented sheath polymer.

7. A coextruded monofilament fishline of claim 6 wherein the core is at least about 50 percent polyethylene terephthalate or polybutylene terephthalate.

8. A coextruded monofilament fishline of claim 6 wherein the core is at least about 80% polyethylene terephthalate and at least about 5% of a copolymer of tera- and isophthalic acids, 1, 4-butane diol and polytetramethylene ether glycol.

9. A coextruded monofilament fishline of claim 1 wherein the sheath polymer, when oriented by stretching about from 4.5 to 6.0 times its original dimension, exhibits a wet tensile strength greater than about 500 MPa and a wet initial tensile modulus of less than about 1400 MPa.

10. A coextruded monofilament fishline of claim 9 wherein the sheath comprises at least about 50% polycaprolactam.

11. A coextruded monofilament fishline of claim 1 wherein the sheath polymer, when oriented by stretching about from 4.5 to 6.0 times its original dimension, exhibits a wet tensile strength greater than about 500 MPa and a wet tensile modulus of less than about 1400 MPa, and wherein the sheath comprises at least about 60% polycaprolactam and the balance is selected from the group consisting of nylon 11, nylon 12, and nylon 6,6 and copolymers of nylon 6 and one or more of nylon 11, nylon 12 and nylon 6,6.

* * * * *